United States Patent Office 3,773,744
Patented Nov. 20, 1973

3,773,744
NITROGLUCAGONS AND PROCESS FOR THEIR PREPARATION
William W. Bromer, Indianapolis, and Jefferson M. Patterson, Greenwood, Ind., assignors to Eli Lilly and Company, Indianapolis, Ind.
No Drawing. Filed Apr. 5, 1971, Ser. No. 131,437
Int. Cl. C07c 103/52
U.S. Cl. 260—112.5
5 Claims

ABSTRACT OF THE DISCLOSURE

Novel nitroglucagons exhibiting hyperglycemic biological activity and prepared by nitrating glucagon using tetraanitromethane.

BACKGROUND OF THE INVENTION

In 1923 a hyperglycemic factor was observed in extracts of pancreas by Kimbal and Murlin, J. Biol. Chem. 58, 337 (1923-24), who named it glucagon. Subsequent research efforts resulted in the purification and crystallization of the factor by Staub et al., Science, 117, 628 (1953); J. Biol. Chem. 214, 619 (1955). Structurally, glucagon is a single polypeptide chain of 29 amino acids. The amino acid sequence of glucagon was established by Bromer et al., J. Am. Chem. Soc. 79, 2807 (1957).

Glucagon exhibits a hyperglycemic effect; in other words, it produces a rise in blood glucose. In this respect, glucagon is in dynamic opposition to the hormone insulin which exhibits a hypoglycemic effect, or a reduction in blood glucose.

Glucagon, moreover, has been shown to exhibit a variety of other biological actions, particularly a positive inotropic effect; Farah and Tuttle, J. Pharmacol. Exptl. Therap. 129, 49 (1960). Thus, administration of glucagon has been shown to produce an increase in the contractile force of the heart of the subject. This has led to extensive use of glucagon in the treatment of hypodynamic heart disorders in which an increase in contractile force is required; Van der Ark et al., Amer. Heart J. 79, 481 (1970).

In 1966 Sokolovsky et al., Biochem. 5, 3582 (1966), reported tetranitromethane as a specific and mild reagent for the nitration of tyrosyl residues in proteins. However, the application of tetranitromethane (TNM) to the nitration of a variety of proteins has demonstrated that several side reactions are prone to occur; see, for example, a review by Glazer, Annu. Rev. Biochem. 39, 101 (1970).

It has now been discovered that novel compounds can be produced by nitrating glucagon using tetranitromethane as nitrating agent. The present invention is directed to these new compounds, and specifically to mononitroglucagon and dinitroglucagon, as well as to a process for their preparation. The new compounds of the present invention not only exhibit hyperglycemic activity such as is present in glucagon itself but also exhibit a hyperglycemic activity having increased intensity over that of glucagon. Additionally, the novel compounds of the present invention exhibit an inotropic biological action similar in intensity to that of glucagon itself.

SUMMARY OF THE INVENTION

This invention is directed to novel compounds which are chemical modifications of the naturally occurring hormone, glucagon, and to a process for their preparation. Specifically, the compounds of the present invention are nitrated derivatives of glucagon.

The compounds of the present invention are characterized as polypeptides having the amino acid sequence of glucagon but differing therefrom in that one or both tyrosine residues contains a nitro group in the 3-position of the 4-hydroxybenzyl group.

Broadly, the process aspect of the present invention is directed to the preparation of a polypeptide having the amino acid sequence of glucagon, but differing therefrom in that one or both tyrosine residues contains a nitro group in the 3-position of the 4-hydroxybenzyl group. This process comprises reacting glucagon at a concentration of from about 1 to about 20 mg. per ml. of a medium which is inert to the reactants and which affords a pH of from about 7 to about 10 with from about 2 to about 8 moles of tetranitromethane per mole of glucagon, at a temperature of from about −10° C. to about +25° C. for from about 0.25 to about 6 hours, and recovering the resulting nitrated glucagon.

DETAILED DESCRIPTION OF THE INVENTION

The glucagon molecule is composed of a single chain of 29 amino acids joined in typical peptide fashion. That is to say, the α-amino function of one amino acid in the sequence is joined to the carboxyl function of the next succeeding amino acid, resulting in the formation of an amide linkage. This results in the presence of a free α-amino function at one end of the ultimate chain and a free carboxyl function at the opposite end of the chain. The amino acid sequence of glucagon under this system is as follows:

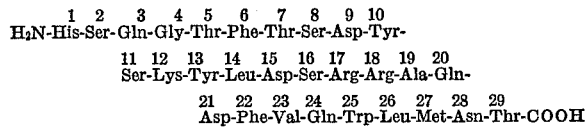

In the above sequence, the abbreviations which are used refer to the following amino acids:

Ala—Alanine
Arg—Arginine
Asn—Asparagine
Asp—Aspartic acid
Gln—Glutamine
His—Histidine
Leu—Leucine
Lys—Lysine
Met—Methionine
Phe—Phenylalanine
Ser—Serine
Thr—Threonine
Trp—Tryptophan
Tyr—Tyrosine
Val—Valine It must be recognized that in any sequence of amino acids such as that indicated above certain of the members of the sequence will contain, in addition to the α-amino function and the carboxyl function, other reactive substituents. Any attempted modification of the polypeptide must take into consideration the various reactive functionalities present in the molecule as well as the possibility of cleavage of the polypeptide into individual amino acids and/or smaller peptide segments.

Even in view of the noted sensitivity of the polypeptide structure and great possibility of structure degradation, it has been discovered that it is possible under the conditions specified herein to nitrate glucagon and to localize the point of nitration while retaining intact the other portions of the molecule. In accordance with the discovery of the present invention, it is possible to nitrate the glucagon molecule at the tyrosine residues present in the amino acid sequence at the 10 and/or 13 positions of the molecule and thereby to modify the 4-hydroxybenzyl portion of the residue to substitute a nitro group in the 3-position of the aromatic nucleus. A nitration can occur in either or both tyrosine residues. Mononitroglucagon results from the nitration of only one of the tyrosine residues. In such an instance it is believed that the principal point of nitration occurs at the tyrosine residue in the 13 position of the amino acid glucagon sequence. This does not preclude mononitration from occurring at the tyrosine residue in the 10 position of the amino acid sequence, and it is not intended to restrict the present invention to mononitration in the 13 position. Dinitroglucagon results from the nitration of the tyrosine residues present in both the 10 and the 13 positions of the amino acid sequence.

The present invention therefore, includes mononitroglucagon in which only one of the two tyrosine residues present in glucagon contains a nitro group in the 3-position of the benzene ring; and, specifically, mononitroglucagon in which the nitro group is in the 3-position of the 4-hydroxybenzyl group in the tyrosine residue located at the thirteenth position of the glucagon amino acid sequence; and mononitroglucagon in which the nitro group is in the 3-position of the 4-hydroxybenzyl group in the tyrosine residue located at the tenth position of the glucagon amino acid sequence.

The present invention also includes dinitroglucagon in which both tyrosine residue contain a nitro group in the 3-position of their respective 4-hydroxybenzyl groups.

Furthermore, the present invention includes mixtures containing the two mononitroglucagons defined hereinabove, as well as mixtures containing the two mononitroglucagons and the dinitroglucagon defined hereinabove.

In view of the many points at which degradation and/or modification of the glucagon molecule can occur, the conditions of nitration must be carefully selected. A relatively mild nitrating agent, tetranitromethane, has been found to nitrate the tyrosine residue of glucagon without accompanying excessive amounts of side products.

The conditions of reaction are quite specific. Tetranitromethane is the essential nitrating agent. The nitration must be carried out at a pH in the range of from about 7 to about 10. Any reaction medium which will result in a pH within this range and which is otherwise inert to the nitration is suitable. Generally, a reaction medium containing an appropriate buffering agent to produce the desired pH will be used. Preferably, the pH of the reaction mixture will be within the range of from about 8 to about 9, and more preferably, the pH will be about 8.

The nitration will be carried out at a temperature of from about $-10°$ C. to about $+25°$ C. Preferably, the reaction temperature will be within the range of from about $0°$ C. to about $+5°$ C., and more preferably, the temperature at which the reaction is carried out will be about $0°$ C.

The reaction time may range from about 15 minutes to upwards of 6 hours. However, it is preferred that the time of reaction be kept at the lower end of this range, generally from about 15 minutes to about 45 minutes, and more preferably, the reaction time should be about 30 minutes.

The concentration of glucagon in the buffered medium is also an important reaction variable. The glucagon concentration must be maintained within the range of from about .1 to about 20 mg. glucagon per ml. of reaction medium. Preferably, the concentration of glucagon will be from about 2 to about 10 mg. per ml., with a concentration of about 10 mg. per ml. being especially preferred.

Concentration of TNM relative to the glucagon is also an important reaction variable. The mole ratio of TNM to glucagon should be maintained within the range from about 2 to about 8. Preferably, this range will be maintained from about 4 to about 8, with the mole ratio of TNM to glucagon of about 4 being especially preferred.

The biological activity of glucagon is enhanced by nitration. An increase is noted in the hyperglycemic effect of the nitroglucagons when compared with an equivalent concentration of glucagon itself. Moreover, the extent of nitration plays a part in the intensity of hyperglycemic effect. That is to say, in equivalent concentrations of mononitroglucagon and dinitroglucagon, the dinitroglucagon exhibits a more intense hyperglycemic effect.

Isolation and recovery of the nitroglucagon from the reaction mixture will be accomplished by techniques generally recognized in the art. In broad outline, the isolation and purification of nitroglucagons from the reaction mixture will include a lowering of the pH from that at which the reaction was carried out to ensure complete precipitation of the crude product from the reaction mixture. The crude product will then be removed from the reaction mixture by centrifuging, filtering, or some other technique well known in the art.

The resulting crude nitrated glucagon will then be subjected to a purification treatment. This purification will generally involve first subjecting the crude nitrated glucagon to gel filtration on a chromatographic column. Suitable gels which may be used are, for example, cellulose, alginic acids, polyacrylamides, and dextrans. Modified dextrans, available under the trademark Sephadex, are particularly suitable. The chromatographic filtration using a gel adsorbent accomplishes generally a separation of components of the crude nitrated glucagon in terms of their molecular weight.

Using the isolation technique herein described, the portion of crude nitrated glucagon separated by gel filtration and corresponding generally to the molecular weight of glucagon itself is then further separated by an ion exchange technique. The ion exchanger which is used broadly can be any suitable anion exchange medium. Specific ion exchange materials which suitably may be employed are diethylaminoethyl cellulose and diethylaminoethyl Sephadex. The sample which is supplied to the ion exchanger and which has already been isolated by gel filtration to contain materials of similar molecular weight, will be further separated with respect to the varying charge characteristics of the components present in the mixture. Thus, it is possible to separate a mixture containing, for example, glucagon, mononitroglucagon, and dinitroglucagon into its individual components by reason of the differences in electric charge of the three structures even though these three structures are of relatively similar molecular weight.

The above technique is illustrative of that which is available for use in isolating and purifying nitrated glucagons from the starting material glucagon and from each other. It is not intended, however, by this discussion to limit the present invention to any particular method of isolation and purification of the nitroglucagons.

The structures of the nitroglucagon of the present invention are determinable by any recognized peptide and/or amino acid analysis technique. Typically, the peptide first will be digested by enzyme or acid hydrolysis, and the resulting individual amino acids or peptide fragments then will be analyzed. The particular techniques involved are well recognized in the art and form no part of the teaching of the present invention.

The following examples are intended to illustrate the preparation, isolation, analysis and biological activity of the nitroglucagons which comprise a part of the present invention.

Nitration of glucagon

Glucagon in an amount of 2.0 grams was suspended in 200 ml. of a 0.15 M solution of a pH 8.0 tris-HCl buffer solution at $0°$ C. The term "tris" refers to trishydroxymethylamino methane. The resulting concentration was equivalent to about 2.9 micromoles of glucagon per milliliter of the buffer solution. TNM (0.275 ml. or 2.30 millimoles) was dissolved in 2.0 ml. of ethanol was added, and the reaction was allowed to proceed with mild stirring at $0°$ C. for 30 minutes. Within three minutes the suspension became a bright yellow. At the end of the 30 minute reaction period, the suspension was transferred to a centrifuge bottle and the pH was adjusted to about 5.0 with 6 N HCl. The resulting mixture was then allowed to stand for three hours at 0° C., after which time it was centrifuged at 2,000 r.p.m. for 30 minutes. The resulting pellet was washed three times with absolute ethanol, resuspended in water and lyophilized. The recovered crude nitroglucagon product weighed 1.837 grams.

Isolation and purification of nitroglucagon

The entire sample of crude nitroglucagon was dissolved in 100 ml. of pH 10.5 sodium hydroxide solution. The pH was quickly adjusted to about 3 by the addition of glacial acetic acid. The resulting crude nitroglucagon sample was then applied to a 5 x 150 cm. G–50F Sephadex column and eluted with 1 M acetic acid. The Sephadex gel filtration resulted in the separation of a substance or group of substances with a molecular weight similar to glucagon from a group of substances with a higher molecular weight. The substance or group of substances corresponding generally to the molecular weights of glucagon, mononitroglucagon and dinitroglucagon was in the predominance and accounted for approximately 1.44 grams of the total sample applied to the gel filtration column.

The portion of the sample purified by gel filtration and corresponding generally to the molecular weight of glucagon was then lyophilized and dissolved in 40 ml. of 7 M urea containing 0.01 M tris-HCl and 0.001 M Versene, the resulting mixture having a pH of 8.5. This sample was then applied to a 3.7 x 120 cm. DEAE (diethylaminoethyl) cellulose column and eluted with a linearly increasing sodium chloride gradient made from 4 liters of the same buffer solution and 4 liters of 0.1 M sodium chloride. The resulting fractions were desalted over G–25C Sephadex using 1 M acetic acid and then lyophilized.

Analysis according to the above procedure determined the presence of five substances, two of which were present in major amounts. The two principal components of the mixture were subjected to amino acid analysis and exhibited the compositions shown in Table I following.

TABLE I.—AMINO ACID COMPOSITION OF GLUCAGON, MONONITROGLUCAGON, AND DINITROGLUCAGON (Residues per mole)

| Amino acid | Glucagon [1] | Mononitroglucagon | Dinitroglucagon |
|---|---|---|---|
| Aspartic acid | 4 | 3.94 | 4.10 |
| Threonine [2] | 3 | 2.85 | 2.86 |
| Serine [2] | 4 | 3.70 | 3.72 |
| Glutamic Acid | 3 | 2.86 | 2.92 |
| Proline | 0 | 0 | 0 |
| Glycine | 1 | 1.00 | 1.06 |
| Alanine | 1 | 1.04 | 1.02 |
| Valine | 1 | 1.00 | 0.99 |
| Methionine | 1 | 0.98 | 0.96 |
| Leucine | 2 | 2.04 | 1.99 |
| Isoleucine | 0 | 0 | 0 |
| Tyrosine | 2 | 1.06 | 0.18 |
| Phenylalanine | 2 | 2.03 | 1.99 |
| Tryptophan | 1 | 0.94 | 1.03 |
| Lysine | 1 | 1.05 | 0.95 |
| Histidine | 1 | 0.95 | 0.92 |
| Arginine | 2 | 2.00 | 2.00 |
| 3-nitrotyrosine | 0 | 1.06 | 1.84 |
| Methionine sulfoxide | 0 | 0 | 0 |
| Total | 29 | 29 | 29 |

[1] Bromer et al., J. Am. Chem. Soc. 79, 2807 (1957).
[2] Not corrected for destruction during acid hydrolysis.

An examination of the mononitroglucagon recovered in an amount of about 1.09 grams, reveals the presence of 1.06 residues of tyrosine and 1.06 residues of 3-nitrotyrosine per mole of glucagon. This establishes the nitration of one of the tyrosine residues of the glucagon molecule with the retention of the other tyrosine residue intact.

Analysis of the other major component, dinitroglucagon, present in an amount of about 0.15 gram, indicates from Table I the presence of about 0.18 residues of tyrosine and about 1.84 residues of 3-nitrotyrosine per mole of glucagon. This establishes the nitration of both tyrosine residues to 3-nitrotyrosine residues.

Biological activity of nitrated glucagons

The hyperglycemic response of nitroglucagon was determined by administering samples to rabbits subcutaneously at a dose rate of 8 micrograms per kilogram rabbit weight. The level of blood sugar present in the rabbit was measured at the time of administering the nitroglucagon. The increase of blood sugar was then determined at varying times during a four hour period subsequent to administering the sample. The results from this test are shown in the Table II following and depict the increased hyperglycemic activity of both mononitroglucagon and dinitroglucagon over glucagon itself.

TABLE II.—INCREASE IN BLOOD GLUCOSE FOLLOWING ADMINISTRATION OF GLUCAGON, MONONITROGLUCAGON, AND DINITROGLUCAGON

| | Mg. glucose per 100 ml. blood plus standard error at hourly times— | | | |
|---|---|---|---|---|
| | 0.5 | 1 | 2 | 4 |
| Glucagon (104 [1]) | 124±3.5 | 147±4.6 | 55±4.5 | −10±1.6 |
| Mononitroglucagon (16 [1]) | 144±8.2 | 179±13.3 | 43±11.0 | −17±2.0 |
| Dinitroglucagon (16 [1]) | 153±8.4 | 187±11.8 | 57±8.4 | −13±1.7 |

[1] Number of rabbits.

Monitroglucagon and dinitroglucagon furthermore exhibit favorable inotropic activity when compared with the recognized inotropic activity of glucagon. The inotropic activity of both mono- and dinitroglucagon is at least as intense as that of normal glucagon.

We claim:
1. A polypeptide having the amino acid sequence of glucagon but differing therefrom in that one or both of the tyrosine residues contains a nitro group in the 3-position of the 4-hydroxybenzyl group.

2. A polypeptide according to claim 1, in which only one of the tyrosine residues contains a nitro group in the 3-position of the 4-hydroxybenzyl group.

3. A polypeptide according to claim 2, in which the tyrosine residue located at position 13 of the glucagon amino acid sequence contains a nitro group in the 3-position of the 4-hydroxybenzyl group.

4. A polypeptide according to claim 2, in which the tyrosine residue located at position 10 of the glucagon amino acid sequence contains a nitro group in the 3-position of the 4-hydroxybenzyl group.

5. A polypeptide according to claim 1, in which both tyrosine residues contain a nitro group in the 3-position of their respective 4-hydroxybenzyl groups.

References Cited

Chem. & Eng. News, Nov. 21, 1966. p. 20.
Sokolovsky et al., Biochemistry (5), 1966, p. 3582–9.
Sokolovsky et al., Biochem. & Biophysica Res. Com., vol. 27, Nov. 1, 1967, pp. 20–25.

LEWIS GOTTS, Primary Examiner

E. G. LOVE, Assistant Examiner

U.S. Cl. X.R.

424—177